United States Patent [19]

Morris

[11] 4,019,869
[45] Apr. 26, 1977

[54] COMBINATION REACTOR-SEPARATOR APPARATUS

[75] Inventor: J. Wayne Morris, Romeoville, Ill.
[73] Assignee: UOP Inc., Des Plaines, Ill.
[22] Filed: Nov. 10, 1975
[21] Appl. No.: 630,601
[52] U.S. Cl. .............................. 23/288 R; 23/283; 208/206; 210/538
[51] Int. Cl.² ................... B01J 8/02; C10G 19/00
[58] Field of Search ................ 23/288 R, 289, 283, 23/284, 285; 196/46; 210/513, 538; 208/189, 203, 206, 208, 226, 230

[56] References Cited

UNITED STATES PATENTS

| 2,543,743 | 2/1951 | Evans | 23/288 R UX |
| 3,102,787 | 9/1963 | McMillan et al. | 23/285 X |
| 3,175,019 | 3/1965 | Parker | 23/284 UX |

Primary Examiner—Joseph Scovronek
Attorney, Agent, or Firm—James R. Hoatson, Jr.; Robert W. Erickson; William H. Page, II

[57] ABSTRACT

A reactor for use with liquid phase reactants which separate into two liquid phases comprising a vertical vessel divided into an upper particle contacting-liquid retention chamber and a lower phase separation chamber by a horizontal liquid barrier. The two phases which form in the upper chamber are separately transferred to an appropriate level in the lower chamber through separate conduits to avoid remixing.

4 Claims, 1 Drawing Figure

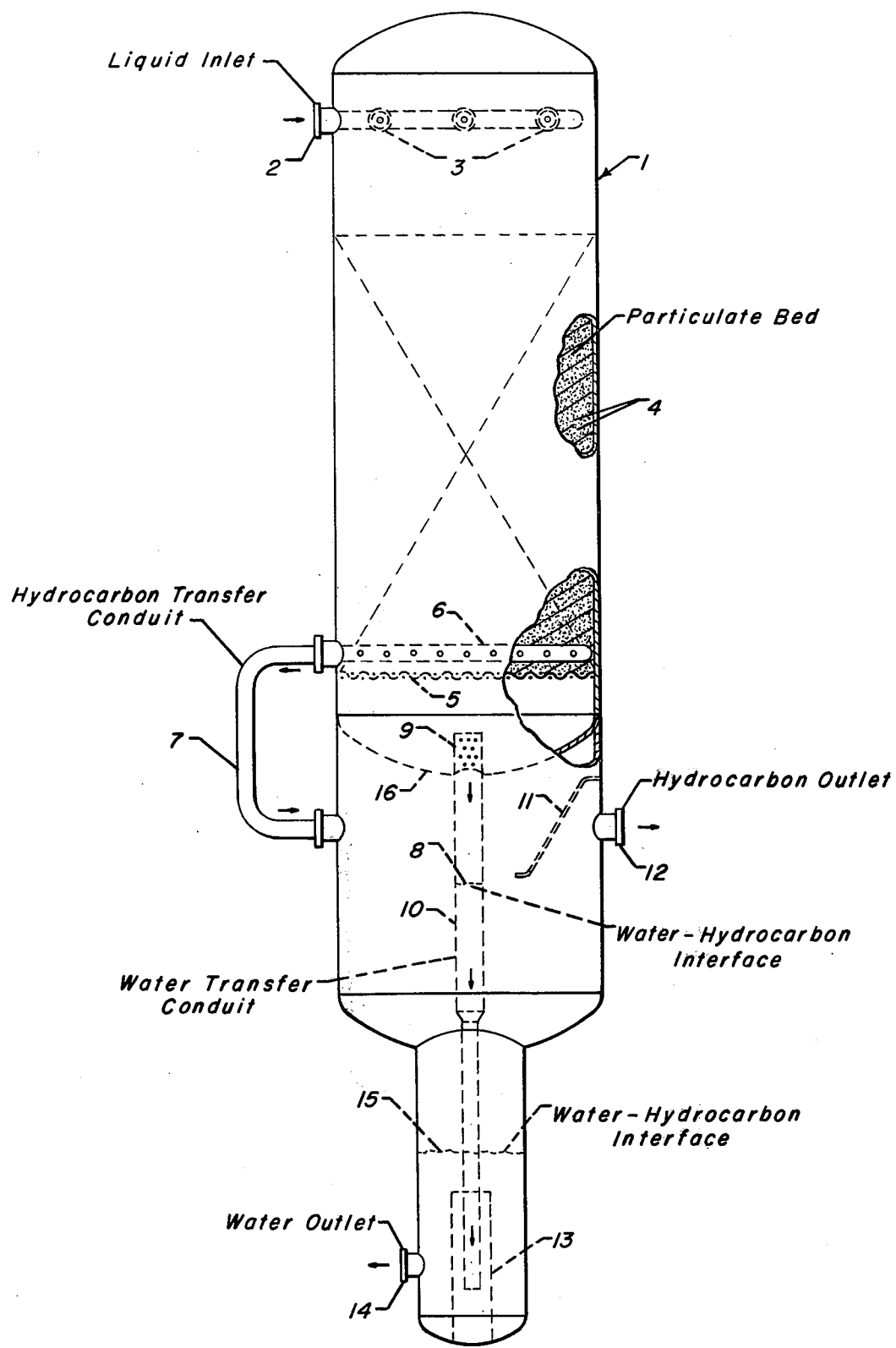

COMBINATION REACTOR-SEPARATOR APPARATUS

FIELD OF THE INVENTION

The invention pertains to an apparatus for contacting liquid reactants with a bed of catalytic material such as found in Class 23-288R. The invention also relates to an apparatus for gravitational liquid separation such as found in Classes 210-513 and 210-532.

DESCRIPTION OF THE PRIOR ART

The design of reactors and of gravitational liquid separators are both old and advanced arts. If both types of apparatus were used in a single process, they were heretofore found as separate vessels. That is, the reactants were removed from the reaction vessel and passed into a separation vessel. The separation of a mixed-phase effluent of a reaction zone within the same vessel as the reaction zone has however been disclosed in U.S. Pat. No. 3,702,237 (Cl. 23-288R). It is also known to utilize a bed of catalyst in an upper portion of a vapor liquid separator to treat the separated vapor stream as shown by U.S. Pat. No. 3,551,323 (Cl. 208-58).

Separate reaction and separation vessels have been used in the process to which this invention is uniquely suited, that is in the catalyzed oxidation of the mercaptans contained in a hydrocarbon stream to disulfides in an alkaline environment. Details of this process are described in U.S. Pat. Nos. 2,988,500 (Cl. 208-206) and 3,574,093. These references are in accord with the prior art in that the reactor effluent is passed into a separate zone or vessel in which the two liquid phases are separated. As hereinafter described, water collecting in the bottom of the vessel housing the catalyst was either withdrawn with the main hydrocarbon stream, and therefore remixed with it, or was intermittently drained off.

BRIEF SUMMARY OF THE INVENTION

The invention provides a unitary vessel wherein a liquid stream comprising hydrocarbons and a small amount of water may be contacted with a bed of particulate matter and also separated into two separate liquid phases. The vessel comprises a horizontal liquid barrier which divides the vessel into an upper contacting and liquid retention chamber and a lower liquid phase separation chamber, a means to pass the stream of liquid reactants into the vessel at a point above a bed of the particulate matter suspended in an upper portion of the upper chamber, a conduit passing downward through the liquid barrier for transferring water collected in the upper chamber to the bottom portion of the lower chamber, a conduit for transferring liquid hydrocarbons collected in the upper chamber as an upper liquid phase to the lower chamber for further separation by gravitational settling, and outlet conduits for removing a hydrocarbon stream from the upper portion of the lower chamber and a water stream from the lower portion of this chamber. This apparatus allows the utilization of the coalescing action of the particulate matter by avoiding the remixing of the two liquid phases formed in the upper chamber prior to their passage into the phase separation chamber. The apparatus therefore provides a more efficient separation and also avoids the former necessity of periodically draining off the water accumulated in the bottom of the particulate-containing chamber.

DESCRIPTION OF THE DRAWING

The drawing illustrates the preferred construction of the apparatus.

The internal volume of the unitary outer vessel 1 is divided into upper and lower chambers by an imperforate liquid barrier 16. A liquid stream comprised of hydrocarbons and a small amount of water enters through a conduit 2 and is spread across the volume of the vessel by branching liquid distributors 3. The liquid stream passes downward through a cylindrical bed of particulate matter 4 supported by a horizontal screen 5. This screen indicates the adjacent boundaries of the upper and lower portion of the upper chamber. The passage of the liquid stream through the particulate matter results in an initial separation of some water as a separate phase which is trapped by the liquid barrier 16. This water passes through openings 9 into a water transfer conduit 10 and a water-hydrocarbon interface 8 therefore forms in the water transfer conduit.

The hydrocarbon phase enters a horizontal collector tube 6 and is transferred to the lower phase separation chamber through conduit 7. The hydrocarbon stream from conduit 7 is further separated in the lower chamber, with the remaining water dropping below a second water-hydrocarbon interface 15. A stream of hydrocarbons containing only an equilibrium concentration of water is removed from under an oil trap 11 through conduit 12. The water transfer conduit 10 carries the water separated in the upper chamber to the lower portion of the lower chamber and discharges it inside a cylindrical agitation reducing means 13. The water joins that settling from the hydrocarbon phase and is removed via outlet 14. Various required parts and subsystems such as screens, valves, manways and control systems have been deleted for the purpose of clarity of presentation. This drawing is not intended to place limitations on the scope or practice of the inventive concept or to exclude the large number of variations which will be apparent to those skilled in the art.

DETAILED DESCRIPTION

One of the more prevalent processes for the treatment of hydrocarbons consists of the oxidation of mercaptans which are admixed in a stream of hydrocarbons to disulfides, a process commonly referred to as sweetening. A common method of performing this is to admix the hydrocarbons with air to provide the required oxygen and then to contact this admixture with an oxidation catalyst under conditions conducive to the oxidation reaction. The oxidation catalyst may be supported by a particulate carrier material, and the process is then referred to as solid bed sweetening.

Although the subject apparatus may find application in a wide variety of uses, it is especially useful as a vessel for performing a solid bed sweetening operation in which a minimal amount of an aqueous alkaline solution is admixed with the hydrocarbon feed stream prior to the passage of the feed stream into the vessel. The presence of the aqueous solution in the hydrocarbon stream may result from a prewashing operation, wherein undesirable materials such as hydrogen sulfide or naphthenic acids are removed. These materials respectively tend to tie up the preferred catalyst and to cause a surface deposit on the particles which interferes with the process. A second source of the alkaline solution is its intentional injection to wet the particulate matter and propagate the continued operation of the process. This may be an intermittent or continuous injection and is necessary if the feed stream contains no alkaline solution.

In addition to the water in the incoming liquid stream, water is formed as a by-product of oxidation reaction. During the passage of the liquid stream through the particulate matter, at least a portion of the water from these two sources tends to coalesce into droplets which fall to the bottom of the vessel containing the particulate matter. In a prior art apparatus this water was either allowed to accumulate until it remixed with the main hydrocarbon stream being withdrawn from the apparatus, or it was intermittently removed from the bottom of the vessel. Allowing the water and hydrocarbons to remix decreases the overall separation efficiency of the apparatus and increases water carry-over. It is an objective of the invention to provide a unitary apparatus in which water settling to the bottom of the contacting chamber is removed without admixture with the hydrocarbon stream. It is another objective to provide an apparatus which avoids the necessity for performing a periodic manual or automatic draining of the bottom of the contacting chamber.

The preferred embodiment of the apparatus is used in accordance with the general teachings of U.S. Pat. Nos. 2,988,500 and 3,574,093, but with only a stoichiometric amount of oxygen and with all oxygen and nitrogen being dissolved in the liquids. More specifically, the apparatus will contain a cylindrical bed of particulate matter which, when used for sweetening, is preferably a bed of charcoal containing about 0.1 to 2.0 wt.% of a metal phthalocyanine disulfonate. The alkaline reagent used in the solution is preferably sodium hydroxide. The conditions normally imposed during this mode of operation include a pressure of from atmospheric up to about 1000 psig. and a temperature from ambient to about 400° F. Under this set of conditions, an apparatus for use in a sweetening operation may be constructed from carbon steel following standard pressure vessel design practices. When used for different purposes the outer vessel and other components may be fabricated out of any suitable material including other metals, plastics, fiberglass, etc.

Basic to the structure of the invention is the elongated, unitary outer vessel. This vessel is vertically orientated along its longitudinal axis and is preferably at least twice as long as its greatest diameter. The vessel may have the shape of a right angle cylinder, but the design shown in the drawing is preferred. The upper and lower chambers may therefore have different diameters. This outer vessel is divided into the upper contacting and liquid retention chamber and lower liquid phase separation chamber by an imperforate liquid barrier. This barrier may be flat, but is preferably dish-shaped as illustrated and extends horizontally across the internal volume of the outer vessel. The preferred construction of the liquid barrier is therefore similar to the heads customarily used on a fluid storage vessel.

Located in the upper portion of the upper chamber is a cylindrical bed of particulate matter. This may be a bed of catalyst, absorbent or filter media, etc. and may therefore comprise either animal or vegetable charcoal, desiccant or activated aluminas, a preformed silica-alumina composite, aggregates, sand, zeolitic materials, plastic spheres, ceramic or plastic packing materials, etc. The bed is preferably supported by a porous metal screen and fills the entire inner cross-section of the vessel. Further, the bed preferably terminates at a substantially horizontal locus or terminus formed by the screen. As used herein, the term upper portion of the upper chamber is intended to refer to the portion of the chamber above this terminus. As may be seen by reference to the drawing, the upper portion is a majority of the upper chamber. Preferably it is equal to at least two-thirds of the total height of the chamber and the screen is in the bottom one-third of the chamber. As an alternative mode of construction, the screen is omitted and the particulate matter rests on the liquid barrier. In this mode the term upper portion is intended to refer to the upper 90% of the height of the upper chamber, and the particulate matter located within the lower portion of the chamber is not part of the functional bed comprising an element of the invention.

The particulated matter should stop short of the top inner surface of the vessel to provide a void volume in which the liquid inlet and distribution means is arrayed. It is preferred that the distribution means is a horizontally branching network of conduits, with each branch having a plurality of liquid outlet openings operatively arranged to project the incoming liquid over the upper surface of the bed of particulate matter. Other types of distributors known to the art may also be used with equal effectiveness. For instance, a single nozzle, a number of nozzles or cone-shaped liquid deflectors, etc. will also serve as suitable distributing means. The liquid should be directed toward the bed and not the walls of the vessel to counteract the normal outward movement of the liquid.

The two liquid phases which form in the upper chamber are each removed at a rate equal to their rate of formation to maintain a liquid-liquid interface which is normally located in the water transfer conduit. Either the denser or the less dense phase may have the greatest volumetric rate depending on the particular use to which the apparatus is adapted. If, for instance, oil is being collected from water being treated by the particulate matter as an environmental protection measure, then the less dense oil phase will normally have a much lower volumetric flow rate.

It is part of the inventive concept to make use of any separation which occurs due to the coalescing nature of the particulate matter in the upper portion of the upper chamber. There are therefore provided means for individually removing and transporting a stream of each phase from the upper chamber to the lower chamber. The inlet of each means should be located to selectively remove only one phase. To this end, the inlet of the hydrocarbon transfer conduit should be located above the liquid barrier and above the expected location of the liquid-liquid interface. Preferably this conduit extends across the internal volume of upper chamber at a point close to or immediately above the bottom of the bed of particulate bed. This conduit should have openings spaced along its sides to allow the entrance of the hydrocarbon phase while discouraging the entrance of falling water droplets. The transfer conduit then preferably extends outside the outer vessel and downward into the lower chamber in a U-shaped formation which terminates at the inner surface of the lower chamber. The hydrocarbon transfer conduit may however take other forms and could, for instance, pass through the liquid barrier similar to the water transfer conduit. This conduit communicates with the upper portion of the lower chamber.

The second, water transfer conduit preferably is a section of straight tubing which passes through the liquid barrier and projects a short distance above it in a single foraminated collection head. The water transfer conduit extends straight downward into the lower portion of the lower chamber. This conduit may have a uniform diameter, but preferably has a smaller diameter lower section as illustrated.

As the term upper portion is used in regard to the lower chamber it is intended to refer to the upper one-half of the chamber as measured by distance. In turn, the lower portion is the lower one-half. This line of separation is different from the location of the liquid-liquid interface in the lower chamber. The location of the interface will be set by a consideration of the relative volumes necessary to provide the desired residence time for each liquid phase. Since in the sweetening operation described herein, the flow rate of the water phase is relatively small, the interface is controlled to be at a low level in the vessel. This is done through the use of control systems known to the art, such as systems operated by differences in density or capacitance.

A stream of each phase will be removed from the lower chamber through suitable outlet means. The outlet means for the less dense phase preferably passes through the wall of the outer vessel in the upper portion of the lower chamber and is flush with the inner surface of the chamber at a point opposite the outlet of the hydrocarbon transfer conduit. The outlet for the denser phase will be in the lower portion of the lower chamber and also preferably ends flush with the inner surface of the chamber. The lower chamber may contain a number of optional structures intended to aid in separating the two phases. These may be common items such as beds of coalescing media. One preferred structure is a cylinder attached to the bottom inner surface of the vessel to form an annulus, with the lower end of the water transfer conduit located within the central cylinder of the annulus and the water outer means communicating with the annulus. A second structure is an oil trap or similar plate which requires the less dense material to rise toward its outlet. Those skilled in the art will recognize that other additional equipment may be utilized within the apparatus.

In accordance with this description, the preferred embodiment may be characterized as a combination contacting-separation apparatus for use with liquid reactants which comprises in cooperative combination an elongated, unitary outer vessel which is vertically orientated about the longitudinal axis thereof, having an internal volume formed by an outer wall and which is separated into an upper chamber and a lower chamber by an imperforate liquid barrier which horizontally traverses said internal volume, a cylindrical bed of particulate matter located within an upper portion of said upper chamber, a feed stream inlet and distribution means operatively communicating with said internal volume at a point above said bed of particulate matter, a liquid water transfer conduit located within said internal volume and which passes vertically through said imperforate liquid barrier from a first point within a lower portion of said upper chamber to a point within lower portion of said lower chamber, a liquid hydrocarbon transfer conduit which passes from a higher, second point within said upper chamber to a point within an upper portion of said lower chamber, a liquid water outlet means operatively communicating with said lower portion of said lower chamber, and a liquid hydrocarbon outlet means operatively communicating with said upper portion of said lower chamber.

EXAMPLE I

A more complete understanding of the apparatus may be facilitated by the following description of a vessel designed for the fixed bed sweetening of a 14,750 barrels per day (bpd) stream of FCC light or heavy naphtha. This liquid feed stream contains about 0.02 wt.% mercaptans which are to be oxidized by disulfides. The activity of the bed of catalyst comprised of charcoal and 0.1 to 2.0 wt.% metal phthalocyanine is maintained by the injection of about 9 bpd of an alkaline aqueous solution when the light naphtha is processed and about 21 bpd when the heavy naphtha is processed. In both cases, the feed stream is subjected to a caustic prewashing operation. The vessel in this example therefore functions as a reactor and a settling vessel for the separation of water from the treated effluent. The bed of particulate matter is comprised of charcoal and sized to provide a liquid hourly space velocity of 2.0 hr.-1. The outer vessel has an inner diameter of 9-½ feet and contains a bed of charcoal 25 feet high. The inlet distributor is made from 6 inch diameter pipe and has three branches. It is located about 2 feet above the upper surface of the charcoal bed. A collector for the hydrocarbon stream is formed by a branching network of perforated 6 inch pipe, and the collector has its horizontal centerline located about one foot above the screen supporting the bed. This screen is located at the circular upper edge of the curved liquid barrier.

The lower chamber is also shaped as illustrated in the drawing with its upper cylindrical outer wall extending downward to a point 7-½ feet below the screen. A curved lead is attached at this point. The distance from this point to the top of the head sealing the bottom of the lower cylindrical section is about 6-½ feet. This lower cylindrical section has an outer diameter of 12-¾ inches. The water transfer conduit has a single 3-inch drain as its inlet and is formed by an upper section of 2-inch schedule 80 pipe and a lower section 1-inch schedule 80 pipe. The outlet of the water transfer conduit empties into a section of 4-inch schedule 40 pipe at a point 9 inches below the top of the 4-inch pipe. Several drain holes are provided at the bottom of this pipe. The hydrocarbon inlet to the lower chamber has a tee attached to it to horizontally direct the liquid toward the edge of the chamber. Both outlets are flush with the inner surface of the lower chamber.

I claim as my invention:

1. A combination catalytic reaction-liquid-liquid separation apparatus for use with liquid reactants which comprises in cooperative combination:
   a. an elongated, unitary outer vessel which is vertically orientated about the longitudinal axis thereof, having an internal volume formed by an outer wall and which is separated into an upper chamber and a lower chamber by an imperforate liquid barrier which horizontally traverses said internal volume;
   b. a cylindrical bed of catalytic particulate matter comprising charcoal containing 0.1 to 2.0 wt. % metal phthalocyanine located within an upper portion of said upper chamber;
   c. a liquid feed stream inlet and distribution means operatively communicating with said internal volume at a point above said bed of particulate matter;

d. a liquid water transfer conduit located within said internal volume and which passes vertically through said imperforate liquid barrier from a first point within a lower portion of said upper chamber and a cylindrical agitation reducing means located at a point within a lower portion of said lower chamber, said conduit discharging into said reducing means;

e. a liquid hydrocarbon transfer conduit which passes from a higher, second point within said upper chamber to a point within an upper portion of said lower chamber;

f. a liquid water outlet means operatively communicating with said lower portion of said lower chamber; and, g. a liquid hydrocarbon outlet means operatively communicating with said upper portion of said lower chamber.

2. The apparatus of claim 1 further characterized in that said liquid water transfer conduit is substantially straight and said liquid hydrocarbon transfer conduit passes through said wall of said outer vessel at two places and comprises a vertical section of conduit outside of said outer vessel.

3. The apparatus of claim 2 further characterized in that said bed of particulate matter is supported by a screen located in the lower one-third of said upper chamber and said first point is below said screen.

4. The apparatus of claim 3 further characterized in that said liquid hydrocarbon outlet means communicates with said lower chamber through an opening opposite the lower end of said liquid hydrocarbon transfer conduit.

* * * * *